United States Patent Office 3,540,218
Patented Nov. 17, 1970

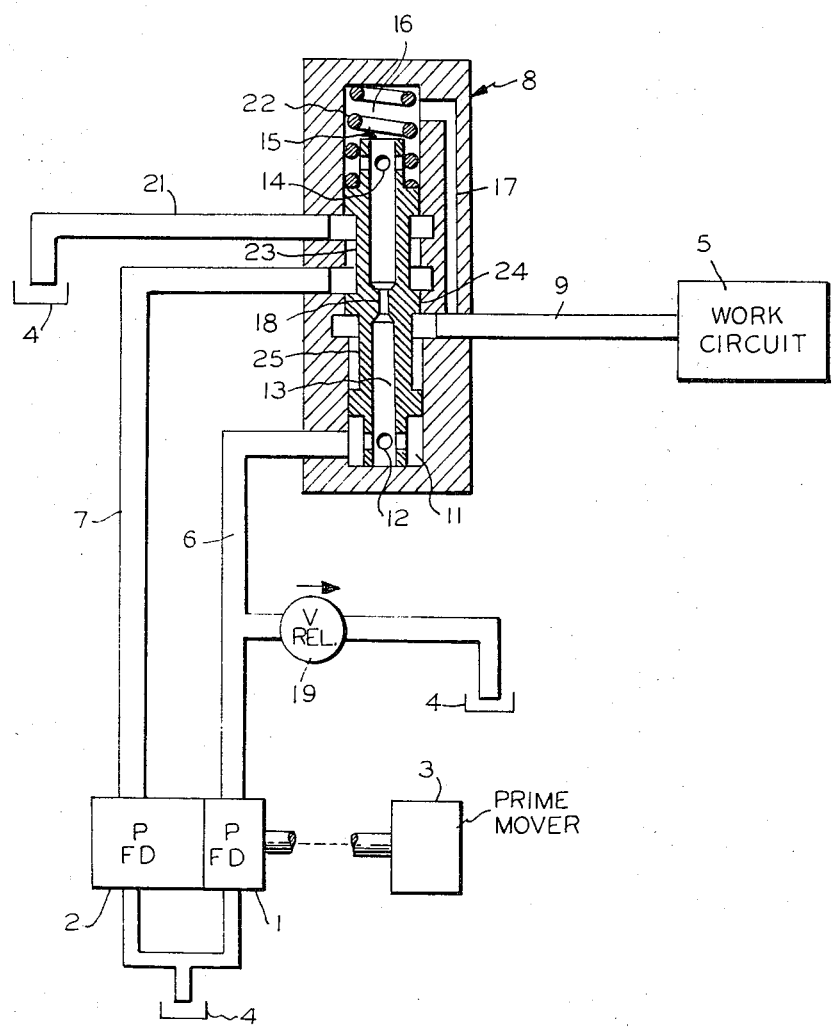

3,540,218
HYDRAULIC SUPPLY SYSTEM WITH TWO PUMPING UNITS
Joseph F. Finn, Jr., Woodland Hills, Calif., assignor to General Signal Corporation, a corporation of New York
Filed May 12, 1969, Ser. No. 823,549
Int. Cl. F15b 13/09
U.S. Cl. 60—52        1 Claim

ABSTRACT OF THE DISCLOSURE

A hydraulic system for supplying fluid to a work circuit at one of two flow rates depending upon the flow demand of the circuit and the speed of the prime mover which drives the supply pump. The system utilizes a supply pump comprising two fixed displacement pumping units of unequal capacities, and includes a differential pressure-producing flow meter which senses the discharge rate of the smaller unit, an unloading valve for the larger unit which is operated by the output pressures of the flow meter, and a relief valve which limits the pressure at the pumping unit side of the flow meter to a value less than the maximum operating pressure of the work circuit.

BACKGROUND AND SUMMARY OF THE INVENTION

In certain hydraulic power systems, for example those used on some aircraft, the flow demand of the work circuit is either small or large and there is little, if any, requirement for intermediate flow rates. Moreover, sometimes the supply pump in these systems is driven by a variable speed prime mover, such as a ram air turbine, which can be stalled easily when it is running at low speed. These conditions require that the supply rate to the work circuit be modulated in accordance with demand, and that the load imposed on the prime mover by the pump be modulated in accordance with driving speed. One system which satisfies these requirements employs a single fixed displacement pumping unit, and a flow and pressure responsive relief mechanism which diverts oil from the supply circuit to tank when either the rate of discharge from the pump is below a predetermined minimum value indicative of inadequate driving speed or system pressure exceeds a selected maximum level indicative of low flow demand. This scheme, however, is inefficient first, because the full output of the pump must always pass through a metering orifice which furnishes the flow or speed signal to the relief mechanism, and second, because a major portion of the pump output must be diverted to tank at a large pressure drop at times when flow demand is low. Another possibility is to employ a small fixed displacement pumping unit which is arranged to deliver oil continuously to the work circuit, and a second, larger fixed displacement unit which delivers oil selectively to that circuit through a pair of unloading devices which respond, respectively, to the discharge rate of the small unit and the pressure in the work circuit. This approach is more efficient than the first since it meters the output of only the small unit and imposes low backpressures on the larger unit when that unit is unloaded. However, it necessarily is more complex and expensive because of the need for two unloading valves.

The object of this invention is to provide a more satisfactory scheme for modulating supply rate in accordance with a decrease in either flow demand or driving speed. As in the case of the second system mentioned above, the invention employs two fixed displacement pumping units of unequal capacities, and an unloading valve for the larger unit which responds to the pressure differential produced by a metering orifice in the connection between the small unit and the work circuit. However, in the present system, this same unloading mechanism also serves to unload the larger unit in response to a reduction in flow demand. This second function is made possible by inclusion of a relief valve which is connected with the discharge line of the smaller pumping unit at a point between this unit and the flow metering orifice. The relief valve diverts to tank a portion of the output of the smaller unit at times when the demand of the work circuit is low, and consequently system pressure is high. This action has the same effect upon the pressure differential produced by the metering orifice as a decrease is pump-driving speed; therefore, the single unloading mechanism is enabled to perform both of the desired functions. Thus, the invention affords the same efficiency advantage as the conventional dual pump system, while eliminating the need for a second unloading mechanism.

BRIEF DESCRIPTION OF THE DRAWING

The preferred embodiment of the invention is described herein with reference to the accompanying drawing which is a schematic diagram of the improved system.

DESCRIPTION OF THE PREFERRED EMBODIMENT

Referring to the drawing, the new system includes a pair of fixed displacement pumping units 1 and 2 of unequal capacities which are driven by a variable speed prime mover 3 and are arranged to draw oil from a tank 4 and deliver it under pressure to a work circuit 5 via conduits 6 and 7, unloading valve 8, and common conduit 9. Pumping units 1 and 2 may be separate pumps having a common drive connection or separately ported groups of pumping elements, e.g. pistons, within a single pump casing. The capacity of the smaller unit 1 is selected so that the delivery rate of this unit at the rated speed of prime mover 3 is slightly greater than the minimum continuous flow demand of circuit 5.

The delivery path from unit 1 to work circuit 5 is continuously open, but, for convenience, it passes through unloading valve 8. This path includes chamber 11, the passages 12–14 formed in unloading spool 15, chamber 16 and passage 17. A metering orifice 18 interposed in axial passage 13 produces a differential between the pressures in chambers 11 and 16 which varies with the rate at which unit 1 delivers oil to circuit 5. A relief valve 19 connected into the delivery path of unit 1 upstream of metering orifice 18 serves to divert to tank 4 a portion of the output of unit 1 at times when the flow demand of circuit 5 is low. If circuit 5 includes its own relief valve, valve 19 is set to crack at a lower pressure.

The output of the larger pumping unit 2 is alternately directed to common conduit 9 or to an exhaust conduit 21 by the spool 15 of unloading valve 8. The spool is biased by spring 22 to the illustrated unloading position, in which peripheral groove 23 interconnects conduits 7 and 21 and land 24 blocks communication between conduits 7 and 9, and is shifted upward to a loading position by the difference between the pressures in chambers 11 and 16 which act upon its opposite ends. In the loading position, land 24 interrupts communication between conduits 7 and 21, and peripheral groove 25 connects conduit 7 with common conduit 9.

When the system is in use and the flow demand of work circuit 5 equals or exceeds the output of small pumping unit 1, relief valve 19 will be closed and the entire output of unit 1 will be delivered to the work circuit via conduit 6, chamber 11, passages 12–14, chamber 16, passage 17 and common conduit 9. If prime mover 3 is running at a speed below the rated speed at which it develops sufficient torque to drive both of the units 1 and 2 under load, the rate of flow through metering orifice 18 will be so low that the net shifting force developed on spool 15 by the difference between the pressures in chambers 11 and 16 will not exceed the bias of spring 22. Therefore, the spool will remain in its illustrated position, and the larger pumping unit 2 will be unloaded to tank 4 through conduit 7, peripheral groove 23 and conduit 21. This, of course, prevents stalling of the prime mover.

As prime mover 3 accelerates, the rate at which unit 1 delivers fluid to circuit 5 increases and so too does the differential between the pressures in chambers 11 and 16. When the prime mover reaches rated speed, spool 15 will shift upward to the loading position in which groove 25 interconnects condiuts 7 and 9. Now, the outputs of both pumping units are available for use in work circuit 5. If there is a demand for this fluid, system pressure will remain below the setting of relief valve 19, and the total output of the two pumping units will be utilized in circuit 5. On the other hand, if the flow demand of circuit 5 is low, system pressure will rise above the setting of valve 19, and the valve will open. When this happens, the full output of unit 1 and a portion of the output of unit 2 will be delivered initially to tank 4. The relief path for unit 2 leads from common conduit 9 to relief valve 19 through passage 17, chamber 16, passages 14, 13 and 12, chamber 11 and conduit 6, so diversion of a portion of the output of this unit reverses the flow through metering orifice 18 causes the pressure in chamber 16 to rise above the pressure in chamber 11. As a result, spool 15 will shift back to the illustrated unloading position. After unit 2 is unloaded, relief valve 19 will close slightly, and unit 1 will again commence to deliver oil to circuit 5 through orifice 18. However, since the minimum continuous demand of circuit 5 is less than the output of unit 1 at the rated spaced of prime mover 3, relief valve 19 will still divert some oil to tank 4, and the flow rate through orifice 18 will not be sufficient to develop the pressure differential necessary to shift spool 15 to loading position. Therefore, unit 2 will remain unloaded unless and until the flow demand of circuit 5 again rises to its high level. In this way, the system conserves energy under low flow demand conditions.

What is claimed is:
1. A hydraulic system comprising
   (a) a work circuit (5);
   (b) a pair of fixed displacement hydraulic pumping units (1, 2) driven by a common variable speed prime mover (3) and having different flow capacities;
   (c) a flow passage (6, 11–14, 16, 17, 9) for leading fluid discharged by the smaller pumping unit (1) to the work circuit (5) and containing a differential pressure-producing flow metering device (18);
   (d) a relief valve (19) connected with the flow passage at a point between the smaller pumping unit (1) and the flow metering device (18) and arranged to divert fluid from the passage to a fluid reservoir (4);
   (e) unloading valve means (8) settable to loading and unloading conditions in which, respectively, it delivers the output of the larger pumping unit (2) to the work circuit (5) and said fluid reservoir (4); and
   (f) actuating means (11, 15, 16, 22) responsive to the differential pressure produced by the flow metering device for setting the unloading valve means to said loading and unloading conditions, respectively, when the rate of flow from the smaller pumping unit to the work circuit is above and below a predetermined value.

References Cited
UNITED STATES PATENTS

| | | | |
|---|---|---|---|
| 1,982,711 | 12/1934 | Vickers | 60—52 |
| 2,614,644 | 10/1952 | Gustafson | 60—525 XR |
| 2,846,848 | 8/1958 | Coker | 60—525 |
| 2,905,191 | 9/1959 | VanderKaay | 60—525 |
| 3,091,929 | 6/1963 | Hipp | 60—525 |

EDGAR W. GEDGHEGAN, Primary Eaxminer